Patented Nov. 30, 1943

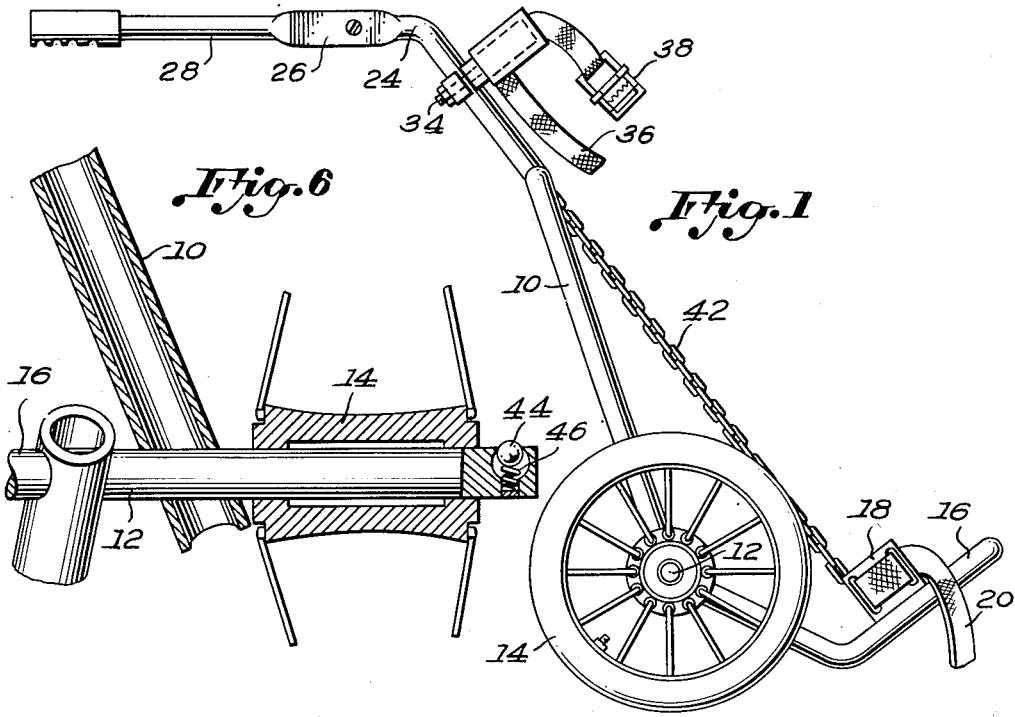
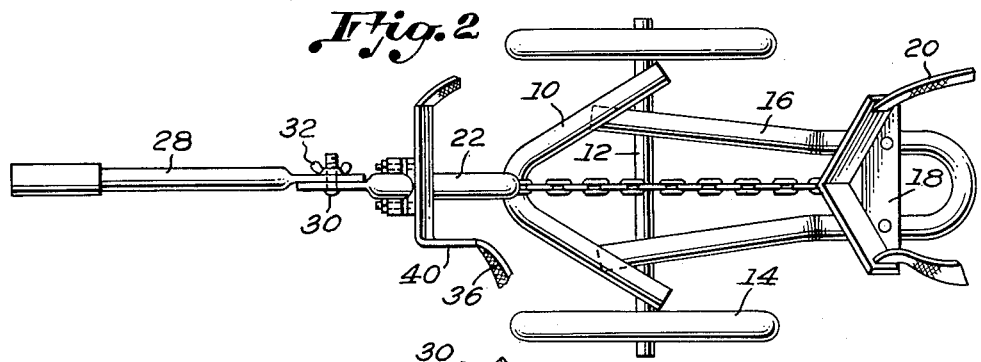
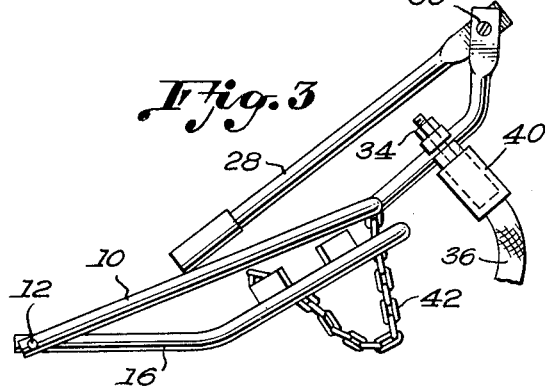

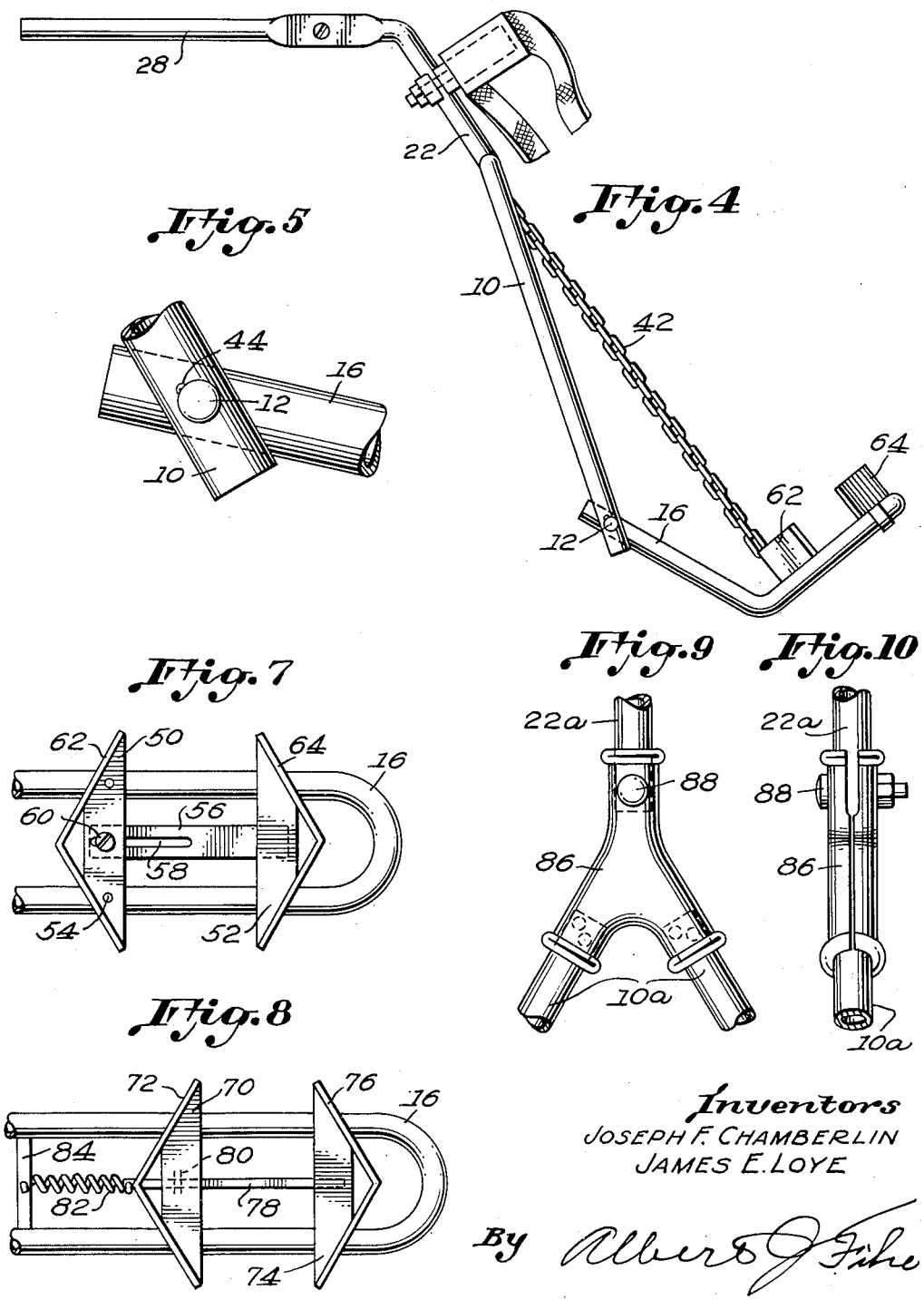

2,335,579

UNITED STATES PATENT OFFICE 2,335,579

COLLAPSIBLE CART FOR GOLF CLUBS

Joseph F. Chamberlin and James E. Loye, Chicago, Ill.

Application August 15, 1940, Serial No. 352,726

1 Claim. (Cl. 280—41)

This invention relates to an improved collapsible cart for golf clubs or the like, and has, for one of its principal objects the provision of a light yet sturdy but easily transported cart whereby golf clubs or similar objects may be conveniently carried from place to place as, for example, over a golf course.

One of the principal objects of this invention is to provide a cart for golf clubs or the like which can be readily folded into a relatively small space so that it can be conveniently carried or stored while, at the same time, it is capable of ready and simple extension into a normal operating shape whereby it can be immediately put to use.

Another and further important object of the invention resides in the production of a collapsible carriage for golf clubs which can be used to transport golf clubs and their containing bags in such a manner that the bags will not be likely to become jolted off or otherwise separated from the cart, being securely held in desired position at all times and also, at the same time, making always readily available the contents of the bag such as the clubs.

A still further important object of the invention is to provide a collapsible golf bag carrying cart which will securely grip the bottom portion of the golf bag and also adequately support and retain the upper portion of the bag without interfering with the player's withdrawal of the clubs in any way.

Another object is to provide a cart of such proportions and dimensions that the golf bag or other object carried thereon will be supported with a low center of gravity, thereby rendering overturning unlikely, and additionally, supporting the golf bag in such a manner that there is no undue weight or pull on the handle when the contrivance is moved from place to place over the golf course by the player.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the improved collapsible golf bag carrying cart of this invention, showing the same in position ready to receive a golf bag or the like.

Figure 2 is a top plan view of the structure shown in Figure 1.

Figure 3 is a side view of the apparatus with the wheels removed and with the same shown in collapsed or folded position.

Figure 4 is a side view of the cart with the wheels removed and just prior to the collapsing or folding operation.

Figure 5 is a detail view of the frame and axle structure, being an enlargement of a corresponding portion of Figure 4.

Figure 6 is an enlarged detail view showing one end of the axle of the cart with a wheel in place thereon and is an end view of the structure of Figure 5, parts being broken away and parts being shown in section for better illustration.

Figure 7 shows a modified form of support for the bottom of the golf bag.

Figure 8 illustrates a further modification of the structure shown in Figure 7.

Figure 9 shows the modified form of frame construction, particularly with regard to the joining of the handle element to the main frame.

Figure 10 is a side elevation of the structure of Figure 9.

As shown in the drawings:

The reference numeral 10 indicates generally the main frame of the improved collapsible bag carrying cart of this invention, the same being preferably of U-shape as shown in Figure 2 and also preferably composed of metal tubing although other shapes and materials may obviously be employed.

This supporting frame element 10 is pivotally mounted at its lower end on an axle 12, the ends of which axle support a pair of wheels 14 which are preferably rubber tired.

Also pivotally mounted on the axle 12 is another U-shaped frame element 16 as best shown in Figures 1 and 2, which is provided with an upward bend at its intermediate portion, the upwardly bent end serving to support a platform or pan-like receptacle 18 into which the bottom of the golf bag is deposited when the device is being made ready for use.

A strap 20 is attached to the pan element 18, the strap having the usual buckles or other fastening means whereby the bottom portion of the golf bag can be conveniently held in desired relationship to the remainder of the structure.

An upright 22 is welded or otherwise affixed to the upper end of the U-shaped member 10, and this is bent rearwardly at its upper end as shown at 24, terminating in a joint 26 to which joint is fixed the inner end of a handle 28. The joint is controlled by a bolt 30 and a winged nut 32 whereby the same can be conveniently locked in extended position or as readily dropped into a folded position.

Mounted on the upright 22 is a bracket 34 which forms a support for the upper end of the golf bag, and this bracket 34 is likewise provided with a strap 36 having a buckle 38 whereby the upper end of the golf bag can also be conveniently and securely fastened in desired position. The bracket is provided with an outwardly extending plate 40 to which the strap 36 is fixed (Figure 2). This prevents any undue constricting of the upper end of the golf bag which might interfere with the ready withdrawal of a club or clubs when desired.

Inasmuch as the lower U-shaped element 16 is pivotally mounted on the axle 12, the same has a tendency to drop and would drag on the ground unless supported in some manner. This support is accomplished by means of the chain 42, the lower end of which is fastened to the pan-like support 18 and the upper end of which is secured to the point of juncture between the top of the U-shaped frame 10 and the upright 22. The chain is of such a length that the support 16 with its pan 18 will be maintained in desired relationship to the ground at all times. The length of this chain may be made adjustable if desired.

As best shown in Figures 4, 5 and 6, the wheels 14 may be removed from the axle 12 by a strong outward pull which will tend to depress the ball 44, which ball is mounted in a recess in the end of the axle 12 and is spring-pressed outwardly by means of a helical spring 46.

As best illustrated in Figure 3, the device can be folded into very small compass after the wheels are removed by loosening the winged nut 32 of the bolt 30, whereupon the handle 28 may be folded downwardly. The U-shaped member 16 can also be bent upwardly about the axle 12, loosening the tension on the chain 42 which then assumes the position shown, and the U-shaped member 10 is contacted on its forward face by the element 16, the handle 28 fitting down into the corresponding space between the legs of the member 10.

In Figures 4 and 7 is illustrated a slight modification of the invention wherein the pan-shaped receptacle for the lower end of the golf bag is made somewhat adjustable. This is accomplished by having the two plate members 50 and 52 mounted on the element 16, one being fixed by means of screws, rivets or the like 54, and the other being slidably held in position by means of an extension 56 which has a slot 58 therein, and in this slot operates a shank of a bolt 60. The bolt is fitted through an opening in the plate 50.

Each of the plates 50 and 52 is provided with an upright side or end element in the form of an angle 62 and 64 respectively. These plates with their angular sides or ends may accordingly be adjusted toward or from each other by means of the bolt 60 acting in the slot 58, thereby making the device suitable for the convenient receiving of any particular golf bag.

A further modification is illustrated in Figure 8 wherein the U-shaped support 16 is provided with a fixed supporting plate 70 having sides 72. There is also provided a movable plate 74 having sides 76. To the plate 74 is fastened a rod 78 which passes through a loop 80 under the plate 70, the farther end of this rod being fastened to a spring 82 which exerts a tension thereon because of its being fastened at its rear end to a cross piece 84. The action of the spring 82 will cause a tendency for the parts 70—72 and 74—76 to move together, thereby exerting a clamping action on the bottom of the contained golf bag. In this manner, the same is securely held in desired position without fear of jolting loose or coming off.

As shown in Figures 9 and 10, the one-piece construction of the frame can be dispensed with, if desired, and two main supporting elements 10a, which converge at the top, can be used, these being fitted into corresponding openings in the bottom of a triangular casting or the like 86. The elements 10a can be fastened into the casting by means of rivets, pins or the like, as shown in Figure 9.

The handle element 22a can be fitted into a corresponding opening at the top of the casting 86 and held in place by means of a bolt 88, so that the handle can be removed if desired. The top of the casting 86 is split, as shown in the figure, so that a suitable gripping action can be accomplished by tightening the nut on the bolt 88.

It will be evident that herein is provided a collapsible cart for golf clubs or the like which will be most convenient in that it solves the problem of a caddie in an inexpensive manner without adding undue labor to the game of golf. Furthermore, the device is so constructed that it can be readily folded into a small compass, thereby creating a distinct advantage over similar carts now in use which require a great deal of space for storage and transportation. Quite a number of carts may in accordance with this invention be stored in a small space when collapsed, thereby overcoming the problem of handling a relatively large number of such carts in rather congested quarters such as a caddiehouse or similar building.

In addition, a cart such as this can be readily folded so that it takes up little, if any, more space than the ordinary golf bag, thereby making the same available for individual players who can transfer the same to and from their favorite golf courses in automobiles or the like with considerable ease. In this manner, a further market is created for the sale and use of such carts which are ordinarily rented at golf clubs but which can now be purchased individually by players and used as desired without creating a troublesome problem of storage and transportation.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

A collapsible carrier for golf bags and the like, comprising an axle, wheels on the end of the axle, two frame elements both pivotally mounted on the axle, a handle fastened to one of the frame elements, flexible means for maintaining the two frame elements in desired relationship to each other when the device is in extended position while, at the same time, allowing of a ready folding of the two frame elements toward each other, means on each frame element for supporting a golf bag, said means comprising a bracket and strap for the top of the bag mounted on one frame element, and a pan and strap for the bottom of the bag mounted on the other frame element, said pan comprising a plate, a rim mounted on the plate, another plate and rim movably mounted on said pan, means for adjusting the position of the movable plate with respect to the fixed plate and spring-pressed means for normally urging the movable plate toward the fixed plate for a gripping support of the bottom of a golf bag and means for readily removing the wheels from the axle.

JOSEPH F. CHAMBERLIN.
JAMES E. LOYE.